J. H. Reighard,
Glass Mold.
No. 71,216. Patented Nov. 19, 1867.
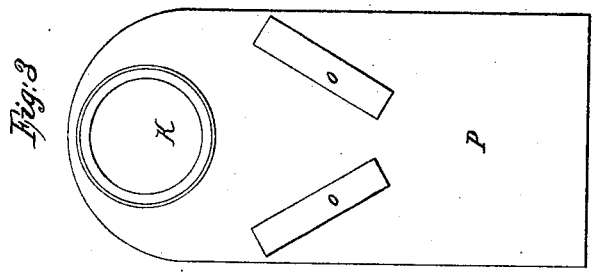
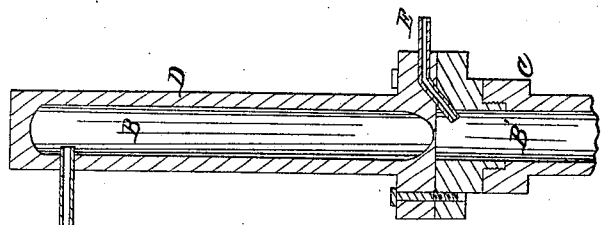
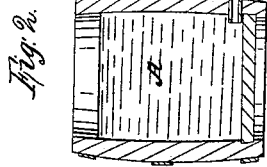
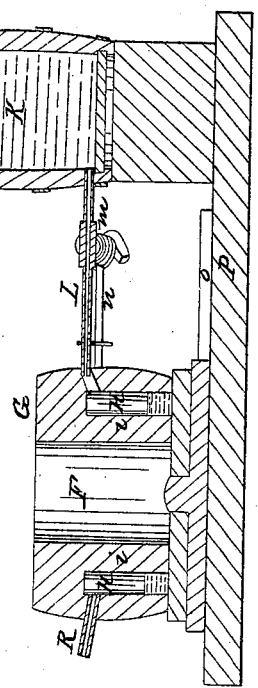
Witnesses.
Inventor.

United States Patent Office.

J. H. REIGHARD, OF WHEELING, WEST VIRGINIA, ASSIGNOR TO J. H. HOBBS, BROCKUNIER, AND COMPANY, OF SAME PLACE.

*Letters Patent No. 71,216, dated November 19, 1867.*

IMPROVEMENT IN GLASS-MOULDS.

*The Schedule referred to in these Letters Patent and making part of the same.*

TO ALL WHOM IT MAY CONCERN:

Be it known that I, J. H. REIGHARD, of Wheeling, in the county of Ohio, and State of West Virginia, have invented a new and useful Improvement in Cooling Glass-Moulds; and I do hereby declare the following to be a full, clear, and exact description of the same, reference being had to the accompanying drawings, forming part of this specification, and in which—

Figure 1 represents a vertical section through the centre of the plunger, piston-rod, and reservoir.

Figure 2 represents a similar section through the mould and its connected reservoir.

Figure 3 represents the press-plate guides.

Similar letters of reference indicate corresponding parts in the several figures.

In this invention the plunger is made hollow, and connected with a hollow piston-rod, and is cooled by water injected through the piston-rod. The mould is formed of two parts, between which is a narrow space. Into this space water is injected from a reservoir, when the instrument is in use, for the purpose of cooling it.

In order that others skilled in the art to which my invention appertains may be enabled to make and use the same, I will proceed to describe it in detail.

In the drawings, A represents a reservoir containing cold water, which it discharges, through the pipe $a$, into the chamber B of the hollow piston-rod D, from which it drops to the bottom of the plunger C. The water is discharged into the chamber B in such a manner that it shall fall to the bottom of the chamber B' within the plunger without coming in contact with the sides of the plunger, by which its heat would be lost before it reached the point most necessary to be cooled. To effect this object, the chamber B may have a bottom perforated at its centre; or the pipe $a$ may project into the middle of the chamber B, and bend downward, so as to discharge its contents in a vertical line through the centre of the chambers B and B'. E is an escape pipe, through which the steam generated by the contact of the water with the heated bottom and walls of the chamber B' shall be permitted to escape.

The plunger C is designed to enter the chamber F, in which the glass is moulded, and to press the glass into the etchings and designs on the walls of the chamber. This chamber is situated in the centre of the mould G, which, by the contact of the heated glass, is also liable to become heated to such a degree as to seriously retard the process. To obviate this, I construct the walls of this mould either of two parts, with a cavity enclosed between them, or having an annular chamber, H, running around within the walls of the mould, and separated from the chamber F only by a thin partition at the points $i$ $i$. Into one side of the chamber H cold water is conducted, from a reservoir, K, by means of a pipe, L, provided with a spring-valve, $m$, and an arm, $n$, which, when pressed longitudinally towards the reservoir K, opens the spring-valve, and allows the water to pass from the reservoir to the interior of the walls of the mould.

The mould is not in any way attached to the reservoir, or its pipe L or arm $n$, but, when about to be used, must be placed so that the end of the pipe L shall project into the entrance of the chamber H, while the wall of the mould comes against the end of the arm $n$. A slight pressure against the arm $n$ then discharges the water into the chamber H, as above described.

The reservoir K may be stationed on a press-plate, P, provided with guides $o$ $o$ to regulate the pressure against the rod $n$. The mould being pressed against the rod till its motion is arrested by these guide-pieces, the valve will not be in danger of being broken by the carelessness or haste of workmen, and a regular and full supply of water will always be forced into the mould. R is an escape pipe attached to the mould to discharge the steam, &c., generated within the chamber H.

Having thus described my invention, what I claim as new, and desire to secure by Letters Patent, is—

1. I claim cooling the moulds used in the manufacture of glass-ware, by means of water introduced into a chamber within the walls of the mould, substantially as above set forth.

2. I claim the use of the reservoir K, pipe L, spring-valve $m$, and arm $n$, in combination with the mould G, having the chamber H, substantially as described.

3. I claim the use of the above-described apparatus, in combination with the press-plate P, having the guides $o$ $o$, substantially as and for the purpose set forth.

To the above specification of my improvement I have signed my hand this sixth day of July, 1867.

J. H. REIGHARD.

Witnesses:
 REES THOMAS,
 JOS. M. WOOD.